United States Patent [19]

Gulden et al.

[11] 4,236,899
[45] Dec. 2, 1980

[54] GAS GENERATOR FOR CATALYTICALLY REACTING LIQUID, HYDROCARBON CONTAINING FUEL TO BE EVAPORATED WITH AN OXYGEN CONTAINING GAS AT ELEVATED TEMPERATURE TO FORM A FUEL GAS, PARTICULARLY FOR SUPPLYING INTERNAL-COMBUSTION ENGINES

[75] Inventors: Peter Gulden, Erlangen; Friedrich Kozdon, Spardorf; Eugen S. de Bucs; Walter Küsebauch, both of Erlangen; Helmut Forster, Neunkirchen; Mathias Schnicke, Uttenreuth; Heinz Christoph; Berthold Pfadenhauer, both of Nuremberg; Gerald Edinger, Berlin, all of Fed. Rep. of Germany

[73] Assignee: Siemens Aktiengesellschaft, Berlin and Munich, Fed. Rep. of Germany

[21] Appl. No.: 943,762

[22] Filed: Sep. 20, 1978

Related U.S. Application Data

[63] Continuation of Ser. No. 779,901, Mar. 21, 1977, abandoned.

[30] Foreign Application Priority Data

Apr. 5, 1976 [DE] Fed. Rep. of Germany ....... 2614670

[51] Int. Cl.³ .......................... C10B 1/00; C10G 9/04
[52] U.S. Cl. .......................................... 48/89; 48/107; 48/120; 48/124; 123/3; 422/191; 422/201
[58] Field of Search ............. 48/94, 93, 95, 96, 102 R, 48/104, 107, 110, 124, 120, 89; 123/3; 60/295; 122/4 D; 422/201, 203, 219, 220, 191

[56] References Cited

U.S. PATENT DOCUMENTS

| 1,154,869 | 9/1915 | McHenry | 48/94 |
| 2,673,446 | 3/1954 | Salardi | 60/295 |
| 3,445,196 | 5/1969 | Thomas | 60/295 |
| 3,635,682 | 1/1972 | Vine et al. | 48/94 |
| 3,828,736 | 8/1974 | Koch | 123/3 |
| 3,853,483 | 12/1974 | Cross, Jr. | 60/295 |
| 3,982,910 | 9/1976 | Houseman et al. | 48/212 |
| 4,018,573 | 4/1977 | Mentschel | 48/107 |

FOREIGN PATENT DOCUMENTS

| 551027 | 5/1927 | Australia | 48/212 |
| 18872 | of 1890 | United Kingdom | 48/102 |

Primary Examiner—Raymond N. Jones
Assistant Examiner—George C. Yeung
Attorney, Agent, or Firm—Kenyon & Kenyon

[57] ABSTRACT

A gas generator which comprises a heat resistant housing and a reaction chamber which is centrally arranged therein and contains a catalytic charge, with an inlet opening for the reactants and an outlet opening for the fuel gas is used for catalytically reacting liquid, hydrocarbon containing fuel to be evaporated with an oxygen containing gas at elevated temperature to form a fuel gas. The housing consists of a lower part and a removable cover and the reaction chamber including the catalytic charge is replaceable. The fuel and/or the oxygen containing gas is fed to the reaction chamber for preheating and evaporating, respectively, via a system of tubes which is arranged between the reaction chamber and the lower part of the housing and is run around the reaction chamber in helical fashion.

31 Claims, 10 Drawing Figures

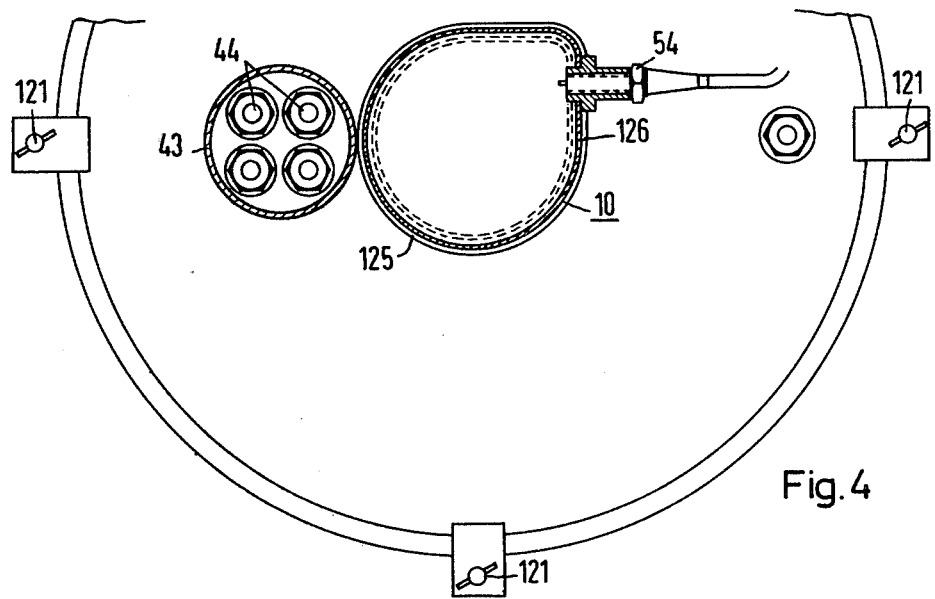
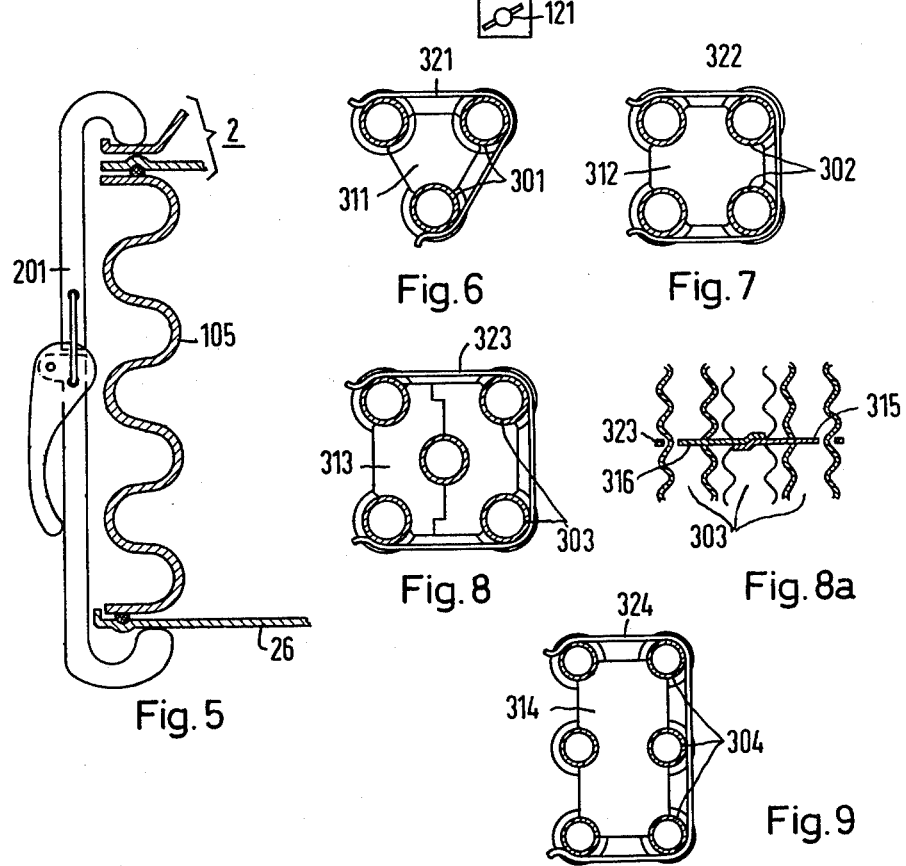

GAS GENERATOR FOR CATALYTICALLY REACTING LIQUID, HYDROCARBON CONTAINING FUEL TO BE EVAPORATED WITH AN OXYGEN CONTAINING GAS AT ELEVATED TEMPERATURE TO FORM A FUEL GAS, PARTICULARLY FOR SUPPLYING INTERNAL-COMBUSTION ENGINES

This is a continuation of application Ser. No. 779,901 filed Mar. 21, 1977, now abandoned.

BACKGROUND OF THE INVENTION

This invention relates to gas generators for catalytically reacting liquid, hydrocarbon containing fuel to be evaporated with an oxygen containing gas at elevated temperature to for a fuel gas in general and more particularly to an improved gas generator with a heat resistant housing and a reaction chamber which is centrally arranged therein which contains a catalytic charge, and which has an inlet opening for the reactants at one end and an outlet opening for the fuel gas at the other end.

Gas generators can serve, for instance, for catalytically converting hydrocarbon containing liquid fuels into a fuel gas which is better suited for the operation of internal combustion engines than the liquid fuel itself. For, in internal combustion engines fed with liquid fuel, the incomplete evaporation of the fuel and the nonuniform mixing with combustion air lead to incomplete combustion and to the emission of harmful substances. In addition, antiknock agents must be admixed to the fuel as a rule, which further increases the content of substances injurious to health in the exhaust gas. If internal combustion engines are operated with fuel gas, the objectionable pollution of the air otherwise produced can largely be avoided. This fuel gas can be generated in a reformed gas generator by partial catalytic oxidation of evaporated or atomized liquid fuel with an oxygen containing gas. This is followed by combustion of the fuel gas with further combustion air, in the internal combustion engine. Since this fuel gas (reformed gas) has a high octane number, the addition of antiknock agents is not needed.

So that such reformed gas generators can be used in motor vehicles, it is necessary that the design of the gas generator and all parts of the installation required for its operation, e.g., the heat exchanger for evaporating and heating up the materials used, be compact. Furthermore, reformed gas generators will be used on a large scale only if, through appropriate design of the gas generator, the costs for manufacture, installation and maintenance can be kept low.

A gas generator is disclosed in British Pat. No. 279,834, in which heavy oil is converted by partial thermal and catalytic combustion with air and, preferably, with the addition of water, into a fuel gas which is used to supply internal combustion engines. In this gas generator, a reaction chamber which is bounded by a cylindrical tube which is open on both sides is arranged in a housing closed-off by a cover plate. The tube has one edge fastened to the cover plate. The other edge, which protrudes into the interior of the housing, is bent toward the cylinder axis, and stacked perforated plates which act as the catalyst rest on it. A nozzle is also arranged at the cover plate for feeding in the reactants. The nozzle opens into a space of the reaction chamber which is free of catalyst. This space is situated in front of the plates and is provided with a refractory lining. There, sprayed in reactants are evaporated and in part converted thermally in the process. The vapors generated are subsequently conducted through the perforated plates and enter into the space between the reaction chamber and the housing. In this space a cup shaped partition, which is connected to the housing via spacers and which conducts the fuel gas leaving the reaction chamber at first along the outside wall of the chamber to the cover plate, is located. There, the fuel gas is deflected and is finally directed along the inside of the housing wall to a discharge stub attached at the center of the bottom of the housing. In the space in between, heat exchangers are further provided in order to warm up the reactants with the hot fuel gas before they are introduced into the reaction chamber. Thus, there is provided, for instance, for heating water, a tube which is run around the reaction chamber in helical turns and the cross section of which is substantially larger than the supply line leading to this tube, so that a large heat exchange area is obtained. Such a tube can also serve for heating the fuel. The tubes are fastened to the cover plate and lead outside the housing into the nozzle disposed at the cover plate. At the cover plate a starting device, is also provided. It opens into the reaction chamber and has an air inlet in which a fuel (e.g. coal or gasoline) can be ignited in order to conduct the hot fuel gas into the reaction chamber to heat up the catalyst.

The design of this known gas generator is relatively expensive, and its manufacture and maintenance would seem to involve high costs. In addition, because of its overall volume and its shape, it cannot be built into existing installations without problems.

SUMMARY OF THE INVENTION

It is an object of the present invention to develop a reformed gas generator of the type mentioned at the outset in such a manner that only low costs are incurred in its manufacture, installation and maintenance. It should further have a volume and a shape such as make it possible to accommodate it, for instance, in the limited engine space of motor vehicles.

According to the present invention, this problem is solved by providing a housing which consists of a lower part and a removably cover and a reaction chamber, including the catalytic charge, which is replaceable.

Such a gas generator can be fabricated from few parts without large expenditures for material and labor, and can be assembled to form a compact unit. For maintenance work on the gas generator, it is only necessary to take off the cover if signs of wear appear at the catalyst, and to replace the reaction chamber. In the case of motor vehicles, this can be done as a matter of routine in the course of the usual maintenance work in repair shops, since such reaction chambers can easily be stocked like cartridges, and personnel skilled in handling catalysts are not needed to replace them. Since, furthermore, the wall confining the reaction chamber is not connected rigidly to the housing but is part of the removable cartridge, the interior of the housing is readily accessible for inspection and cleaning.

The reaction chamber is preferably designed as a cylinder open on both sides, the edges of which carry holders which are directed toward the cylinder axis and against which plates with passage canals rest. These plates constitute the boundary of the reaction chamber at the open ends of the cylinder. A packing arranged between these plates advantageously serves as the catalytic charge. In one preferred embodiment of the gas generator, additional plates with passage canals are embedded in this catalytic bed perpendicular to the cylinder axis and arranged in tandem at spacings.

It is also preferred that the gas generator have a reaction chamber which is fabricated of metal and has at least a partial ceramic lining. This lining can consist of parallel ribs which at the same time hold the plates spaced from each other. At least one of the plates is advantageously designed as a distributor plate, i.e., the passage canals of the plate are distributed over the plate surface in such a manner that the reactants are distributed as uniformly as possible over the entire cross section of the catalytic charge when they flow through the reaction chamber.

In such a reaction chamber, the thermal conductivity of the plates, which is higher than that of the packed bed, brings about a reasonably uniform temperature distribution. In the statistically distributed spaces of the catalytic packing, a violent mixing of the reactants takes place. In this manner the reactants come into intimate contact with the catalytic surface of the charge. The ceramic lining protects the reacting materials against contact with the metallic wall of the reaction chamber during the reaction.

To hold the exchangeable reaction chamber in its position when the cover is closed, an embodiment is preferred in which parts of the reaction chamber engage with profiled parts of the housing and/or the cover. With the cover closed, the reaction chamber is advantageously held by the cover pressure.

In one preferred embodiment of the gas generator according to the present invention, support pieces are provided which hold the reaction chamber at a distance from the lower part of the housing. This produces an intermediate space through which the hot fuel gas can flow and which insulates the reaction chamber thermally from the housing wall. Legs which are arranged perpendicular to the wall of the housing and which point in star fashion from the outlet opening of the reaction chamber into the space between the reaction chamber and the housing can advantageously be used as support pieces. However, it is also possible to use posts which are arranged at the reaction chamber and which engage with corresponding depressions in the bottom of the housing as support pieces. The part of the housing wall which is opposite the outlet opening of the reaction chamber, is then advantageously domed toward the outlet opening. The legs as well as the curvature cause the fuel gas leaving the reaction chamber to be uniformly guided radially into the reaction chamber.

In a further preferred embodiment of the present invention, the lower part of the housing is substantially cup-shaped, and the space between the side wall of the reaction chamber and the lower part of the housing contains a cylindrical partition which extends from the bottom of the lower part of the housing up into vicinity of the cover and divides the space into two annular chambers surrounding the reaction chamber.

At the bottom of the outer annular chamber, one or more discharge stubs for the fuel gas are advantageously attached. In this embodiment, the emitted hot fuel gas is first guided by the partition along the side wall of the reaction chamber toward the cover, holding the reaction chamber at elevated temperature; at the cover, the fuel gas is then deflected and now flows along the wall of the housing through the outer annular chamber to the discharge stub, being cooled down in the process. This cooling can be further improved by cooling fins disposed on the outside of the housing. However, the fuel gas can also advantageously be led off tangentially from the outer annular chamber through one or more discharge stubs in the vicinity of the bottom. It is achieved thereby that the fuel gas flows through the chambers along a helical path, which causes a more intensive flow against the chamber and housing walls. A section of corrugated pipe can also be used as the side wall of the lower part of the housing. The enlarged surface of the pipe brings about stronger cooling of the fuel gas. In this case it is advantageous if the section of corrugated pipe is stressed in compression when the cover is closed, i.e., pushes against the cover under spring pressure and thereby seals the housing. This can be accomplished, for instance, by using a toggle lever for closing the cover which clamps the section of corrugated pipe between the cover and the bottom of the housing.

In one preferred embodiment of the gas generator according to the present invention, there is installed in the space between the reaction chamber and the bottom of the housing a first system of tubes, which is fastened with both its ends at the cover, surrounds the reaction chamber in helical windings and serves to feed the fuel gas and/or the oxygen containing gas to the reaction chamber. This system of tubes consists of a bundle of tubes which run and are connected in parallel. This makes a compact heat exchanger, which serves for heating the raw materials and at the same time for cooling the hot fuel gas.

The cross section area of a tube which is responsible under given pressure conditions for the flow resistance and the attainable flow in the tube, increases with the square of the tube diameter, while the wall surface increases only linearly. The ratio of the heat exchange area to the throughput thus becomes worse with increasing tube diameter. If a bundle of smaller tubes is used, however, this ratio can be improved and a large heat exchange surface is obtained in a small volume.

In order to increase the heat exchange surface still further, the system of tubes can advantageously be made of metallic corrugated tubing. Such corrugated tubes are commercially available for use as flexible connections between pipelines and can be manufactured inexpensively and readily bent into coils. In addition, turbulence in the medium that flows through the tubes occurs at the successive constrictions and expansions of the tube cross section. This leads to convective mixing of the medium to be heated.

The tubes of a tube bundle are preferably supported in spacers, which makes unimpeded access of the hot fuel gas to the entire heat exchange surface of the tube bundle possible. The tubes are preferably bundled by resilient metal clamps. However, the turns of a tube bundle can also be held by the tines of comblike mountings. In particular, it is advantageous to twist the tubes of a bundle relative to each other. Such tubes can easily be wound by machine, the twist also providing a certain amount of stiffening of the winding.

Advantageously, the first tube bundle is used for heating up the oxygen containing gas. The fuel can then be fed to the reaction chamber via a separate feed line. This is necessary particularly if the heat content of the hot fuel gas, while sufficient for heating the oxygen containing gas, is not sufficient for heating and evaporating the fuel, so that the fuel must be otherwise evaporated (for instance, in a heat exchanger heated by the hot exhaust gas of the internal combustion engine). It is preferred, however, to provide a second system of tubes for heating the fuel in the space between the reaction chamber and the housing. This tube system may likewise consist of a tube bundle or a single helically wound tube, which may be made of corrugated tubing.

The tube systems are advantageously designed so that the reactants are introduced into a mixing chamber arranged ahead of the reaction chamber. In this case, the tube systems preferably end in a cavity in the cover, which is connected via passage openings to the mixing chamber. This cavity serves as a plenum for the media coming out of the individual tubes.

A particularly compact and simple design is obtained where the cavity surrounds the mixing chamber like a ring. Baffles may advantageously be arranged at the passage openings in order to conduct the reactants tangentially from the annular cavity into the mixing chamber. A rotation is thereby imparted to the reactants entering the mixing chamber and they are mixed with each other tubulently.

The mixing chamber is advantageously formed by parts of the cover and the boundaries of the reaction chamber. The mixing chamber is thus formed by appropriately shaped, already existing parts of the gas generator without the need for separate walls.

At the cover of the housing a starting device, in which fuel can be burned and the hot gases produced by the combustion fed into the mixing chamber is arranged to advantage.

The lower housing part of a particularly preferred embodiment of the gas generator according to the present invention substantially has the shape of a cylindrical cup, the diameter of which is larger than or approximately equal to twice its height. In such a flat, box-like shape, the danger that the tube systems which are fastened, for instance, at the cover, will get wedged into the housing due to thermal distortions is lessened. Such wedging would make the disassembly of the gas generator for maintenance work more difficult. Furthermore, a flat housing of this nature can be cleaned out more easily and also, the fitting of replaceable reaction chambers into the housing is simplified. Such a box may have demensions approximating those of customary air filters used in motor vehicles and can be installed in existing installations with corresponding ease.

BRIEF DESCRIPTION OF THE DRAWINGS

FIG. 4 is a cross section along the line IV—IV of the reformed gas generator shown in FIG. 3.

FIG. 5 is a section from another embodiment of a gas generator according to the present invention.

FIGS. 6 to 9 illustrate embodiments for the bundling of corrugated tubes, which are used in embodiments of the present invention.

DETAILED DESCRIPTION OF THE INVENTION

Figure 1:
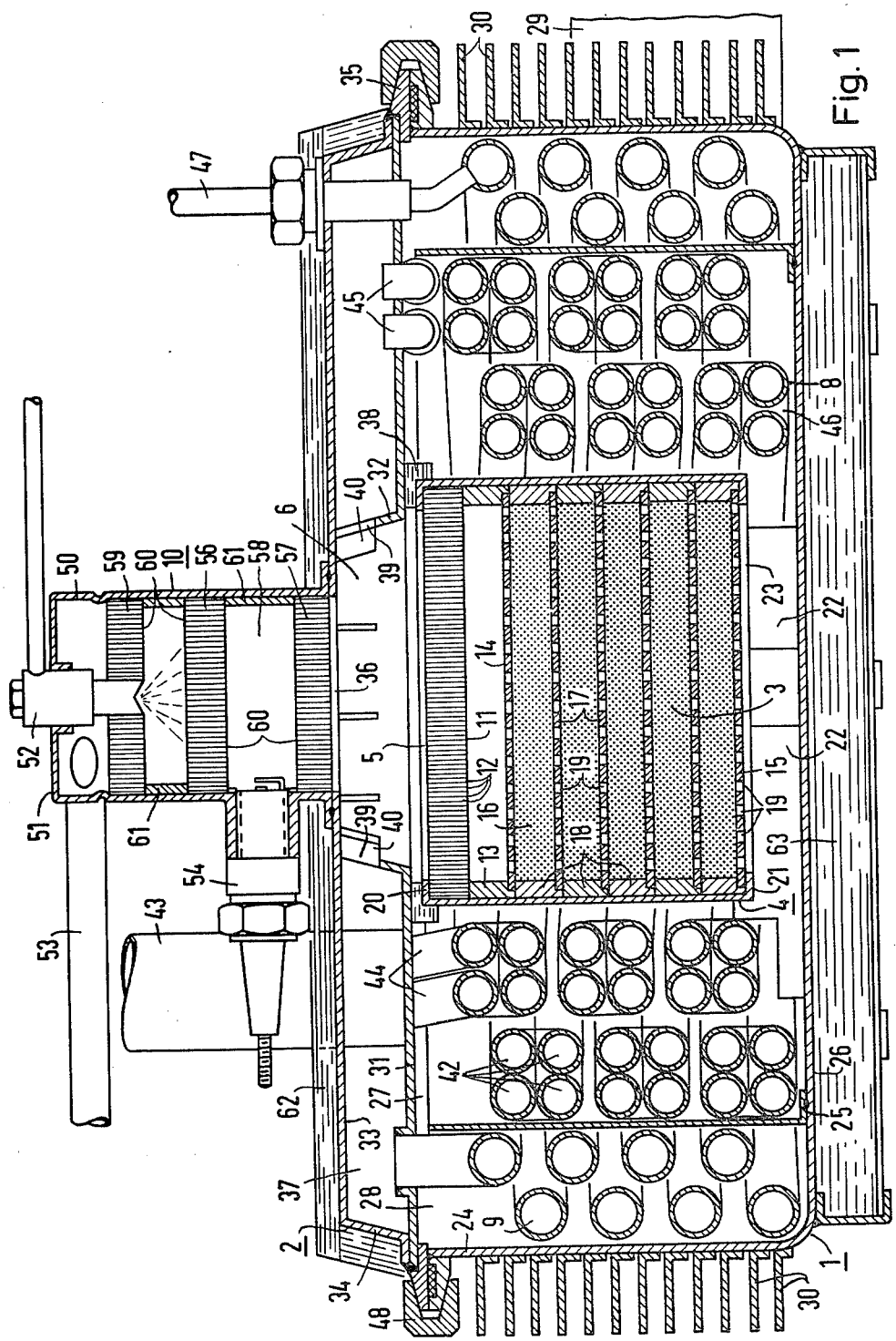
FIG. 1 is a longitudinal cross section through one embodiment of the reformed gas generator according to the present invention.

The reformed gas generator shown in FIG. 1 consists substantially of a lower housing part 1 in the shape of a cylindrical cup, a removable cover 2, a reaction chamber 3, which is centrally arranged in the cup and is formed by a cylindrical pipe section 4, a mixing chamber 6, which is arranged in front of the cylinder openings 5, two systems of tubes 8 and 9 installed in the space between the reaction chamber and the lower housing part for feeding air and fuel to the mixing chamber, and a starting device 10 opening into the mxing chamber 6.

At the inlet 5 of the reaction chamber 3, a porous, ceramic sintered block 11 which carries a multiplicity of uniformly distributed passage canals 12 is arranged. Such a sintered block can be made, for instance, of magnesium oxide and have about 40 to 60 passage canals per $cm^2$ with a diameter of about 1 mm. Adjacent to this sintered block and spaced from it by a ceramic rib 13, is the catalytic charge. This catalytic charge consists of a packed bed 16 which is piled between metallic plates 14 and 15 and in which further metallic plates 17 are embedded spaced one behind the other resting on ceramic ribs 18. Rings of cast porcelain which are stacked up in such a manner that they form a ceramic lining of the reaction chamber 3 may also be used for the ceramic ribs 13 and 18. The packing can comprise for instance, small cylindrical rods of about 1 mm diameter and 3 mm length of $Al_2O_3$ with 0.3% by weight iron, 0.3% by weight chromium and 1.0% by weight molybdenum as the catalytic component. The metallic plates 14, 15 and 17 are made of V2A stainless steel and carry a multiplicity of passage canals 19 of about 1 mm diameter, uniformly distributed over the surface of the plate. The passage canals 12 and 19 of the sintered block 11 and the metal plates 14, 15 and 17, respectively, distribute the reaction media uniformly over the cross section of the reaction chamber. The sintered block 11 at the same time gives protection against backfiring, in order to protect the reactable mixture in the mixing chamber from the high temperatures of the reaction chamber.

The reaction chamber 3 including its content is designed as a replaceable cartridge. Such a cartridge can be produced, for instance, by bending a sheet metal cylinder inward at an open end, where the rim produced, which is directed toward the central axis, serves as a holder 21 for the metal plate 15. Then, one metal plate and one ceramic rib each are inserted, the bed of packing filled in, the next metal plate inserted, and so forth; on the last metal plate 14, the rib 13 is finally placed and the final sintered block 11 is put in place. Finally, the protruding edge of the sheet metal tube is bent inward at the sintered block in such a manner that it serves as a holder 20 for the sintered block 11.

The reaction chamber 3 rests on legs 22 which stand on the bottom of the lower part of the housing and radiate from the central axis in star-fashion. These conduct the fuel gas leaving the outlet opening 23 of the reaction chamber radially into the space between the reaction chamber and the side wall 24 of the lower part of the housing. These baffles are notched so that the cartridge can be fitted in and will be held in a vertical position.

In the space between the reaction chamber and the side wall, a cylindrical partition 25 is disposed concentrically, which extends from the bottom 26 of the lower housing part to up near the cover 2 and divides the space into two concentric annular chambers 27 and 28. At the side wall 24 of the lower housing part, an outlet stub 29 for the fuel gas is provided which leads tangentially into the outer ring chamber 28 in the vicinity of the bottom 26. On the side wall 24 of the lower housing part, cooling fins 30 are applied on the outside.

The cover 2 of the housing consists of a lower ring plate 31 with an upward pointing collar 32 at the inner rim as well as of an upper ring plate 33 with a downward pointing collar 34. These two plates are placed on each other in such a manner that a toroidal cavity 37 results. At their outer edges, the two plates 31 and 33 are welded to each other and to a flange 35. The starting device 10 is welded to the upper ring plate 31 in such a manner that the inner edge of this upper ring plate 33 defines the aperture of the starting device as it opens into the interior of the housing. By placing the cover 2 on the lower housing part 1, a mixing chamber 6 is produced, which is bounded by the aperture of the starting device, the collar 32 of the lower ring plate 31 as well as by the inlet 5 of the reaction chamber 3. The chamber 6 is sealed by a sealing ring 38. This space serves as the mixing chamber for the reaction media. The collar 32 of the lower ring plate 31 has passage openings 39 which connect the toroidal cavity 37 with the mixing space 6, and baffles 40 which conduct the reaction media tangentially from the cavity 37 into the mixing chamber 6. These baffles are formed by inwardly bent parts of the collar 32.

The system of tubes 8, which consists of a bundle of four tubes 42 which are run around the reaction chamber in helical turns is located in the inner ring chamber 27. Air is conducted to the inlet openings 44 of these tubes via a feed tube 43 protruding through the cavity 37 of the cover. The air is heated up during the circulation around the hot reaction chamber and flows into the cavity 37 of the cover via outlet openings 45 at the other end of the tube. The tubes 42 are held together by spacers 46 and metallic springs.

In a similar manner, a tube system consisting of a single tube 9 arranged in helical turns is provided in the outer ring chamber 28. Gasoline which likewise flows into the cavity of the cover after being heated up is fed to the tube 9 via a fuel supply line 47 leading through the cavity of the cover 2.

The tube 9 and the tubes 42 of the tube bundle 8 consist of metallic corrugated pipe, i.e., a tube having a cross section of which is alternatingly constricted and expanded along the tube. In FIG. 7, a bundle of corrugated tubes 302 which are supported in spacers 312 and are held together by metal springs 322 is shown. They are twisted relative to each other, whereby a stiffening of the turns is acheived and a further mount is unnecessary. A tube system which runs through the reaction chamber in the form of an inner helix from top to bottom and in the form of a helix concentric therewith from bottom to top is thereby formed. These helices are removed from the interior of the housing when the cover is lifted, so that the housing can be cleaned easily.

For closing and sealing the cover when in place, a clamping ring 48 which engages with the flange 35 is further used.

The starting device 10 consists of a starter housing 50 in the form of an upsidedown cup with an injection nozzle 52 for gasoline, which is attained at the bottom of the cup and protrudes in the direction of the central axis into the interior of the starter housing; an air intake line 53 and an electric spark plug 54. A burner plate 56, the narrow side of which extends up to the starter housing, is located in the spray cone of the injection nozzle 52. The opening 36 of the starter housing into the mixing chamber is filled by a terminating plate 57. The space between the burner plate and the terminating plate represents a combustion space 58, in which the electric spark plug 54 is arranged.

The air intake line 53 is arranged tangentially at the side wall of the starter housing in the vicinity of the bottom 51. Between the mouth of the air intake line and the burner plate 56, a further plate 59, through which the injection nozzle 52 projects, is provided. The burner plate 56, the terminating plate 57 and the further plate 59 consist of ceramic plates which are penetrated by a multiplicity of passage canals 60 and may be made, for instance, of magnesium oxide. Between these plates, ceramic ribs or rings 61 are provided, which form a lining of the starter housing and keep the plates spaced. The nozzle 52 is designed as a solid cone nozzle, so that the entire surface of the burner plate 56 is hit by atomized gasoline.

The cover 2 and the bottom 26 of the lower housing part carry layers 62 and 63 respectively of insulating material.

Figure 2:
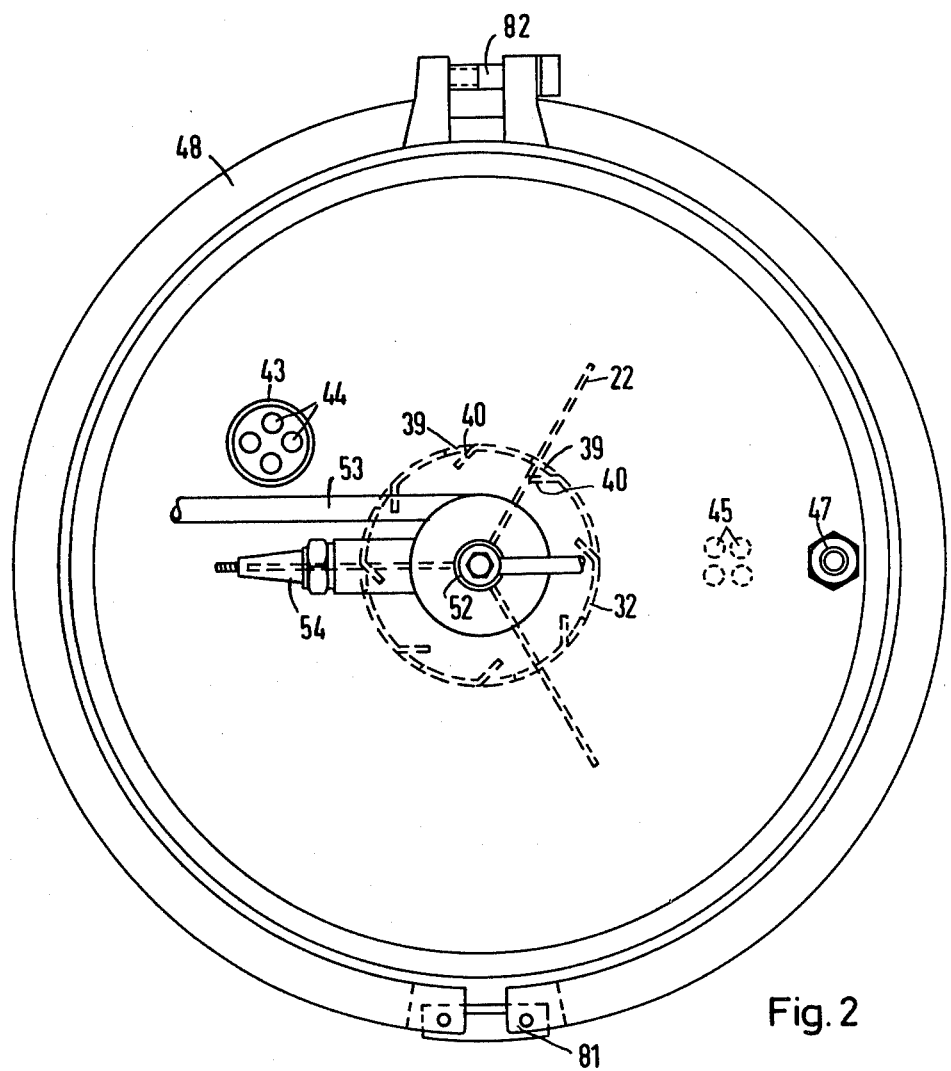
FIG. 2 is a top view of the embodiment of FIG. 1.

In FIG. 2, a top view of this embodiment of the reformed gas generator according to the present invention is shown. As can be seen, the clamping ring 48 has a joint 81 and on the opposite side, a screw connection 82. The legs 22 at the bottom of the housing as well as the ends 44 and 45 of the tube bundle 8, which are not visible when the cover is closed, are further shown by dashed lines. In addition, the upward pointing collar 32 of the lower ring plate 31 of the cover 2 which carries the passage openings 39 and in which some portions of the surface are bent inward to form the baffles 40 is shown by dashed lines.

Figure 3:
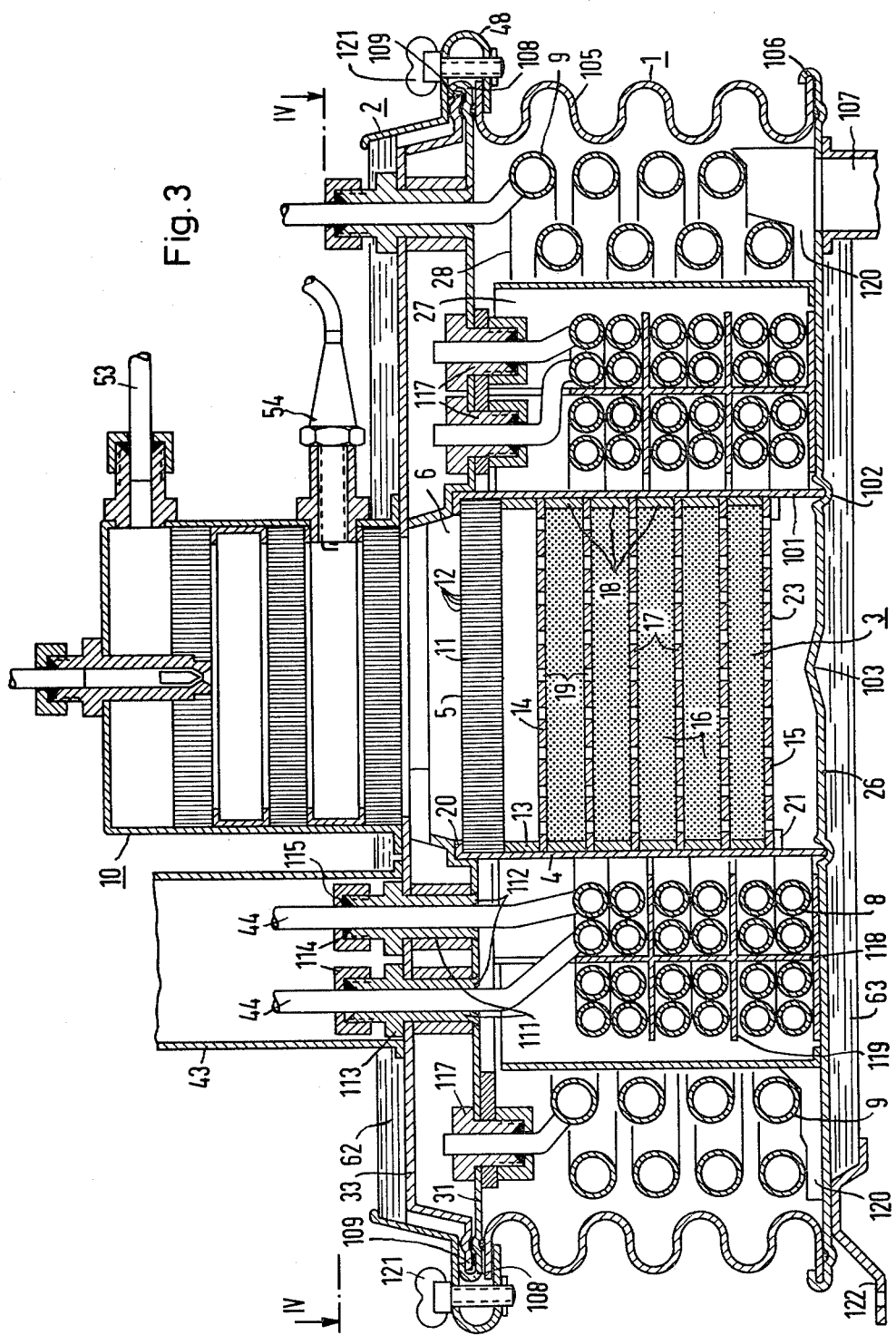
FIG. 3 is a longitudinal cross section through another embodiment of the reformed gas generator according to the present invention.

In the embodiment of the gas generator according to the present invention shown in FIG. 3, the reference numerals of corresponding parts agree with the reference numerals according to FIG. 1. Contrary to the first embodiment example, only parts of the lower cylinder edge 21 in the reaction chamber 3 are bent toward the central axis and form a holder for the plate 15. Other parts of the cylinder rim engage with corresponding depressions 102 of the housing bottom, as projecting posts or feet 101 whereby the position of the reaction chamber is fixed and the latter is held spaced from the lower part of the housing. Similarly, the reaction chamber 3 engages at the upper edge 20 with correspondingly profiled parts of the cover 2. It is therefore impossible for the cartridge to shift when the cover is closed.

This embodiment furthermore has no legs attached at the bottom of the lower housing part. Instead, the bottom 26 of the lower housing part has a rise 103 which points toward the outlet opening 23 of the reaction chamber and through which the emanating fuel gas is likewise deflected and is conducted radially into the inner ring chamber 27. A section of corrugated pipe 105, which is held by the bent over rim 106 of the housing bottom acts as the side wall of the lower housing part. At the bottom of the housing, two discharge stubs which lead from the outer ring chamber 28 and of which only one is visible in FIG. 3 are attached. The two ring plates 31 and 33 which form the cover 2, are joined together by bending the rim 108 of the lower ring plate 31 over the rim 109 of the upper ring plate 33.

The inlet ends 44 of the tube bundle 8 are brought through appropriate holes and through the cover and are held in sleeves 111. The sleeves have a cylindrical end which is inserted into the holes up to a shoulder 113 and then flared out at the lower end 112 mechanically after insertion. This brings about additional securing for the ring plates 31 and 33 of the cover. On the free end of the sleeves 111, screw caps 114 by means of which sealing rings 115 are pressed against the tube ends 44 which protrude through the sleeves 111 are screwed. The pipe 43 welded to the cover serves for feeding the air to the tube bundle 8.

In a similar manner, the inlet end of the tube 9 carrying the fuel is fastened to the cover. The outlet ends of the tube 9 which lead into the cavity 37 of the cover, or of the tube bundle 8, respectively, are also held by such sleeves 117. By means of them, comb-like mountings 118 are also fastened to the housing cover; the tubes of the tube bundle are run between their tines 119.

In the outer ring chamber 28 baffle plates 120, which are arranged at an acute angle to the bottom of the housing and protrude beyond the mouth of the discharge stubs 107, and which set up a rotation in the fuel gas to be discharged are also provided.

The lower part of the housing 1 is locked to the cover 2 by means of the clamping ring 48 which in this embodiment is pressed together by four screws. The clamping ring is designed at the same time as a holder for the heat insulating layer 62 of the cover. The heat insulating layer 73 in the bottom of the housing is held by mountings 122, which are designed at the same time as legs for the reformed gas generator.

The side wall of the cup-shaped starting device 10 has two flat surface portions 125 and 126 which meet at a rounded angle. Such flat areas are particularly well suited for fastening the spark plug 54 and the air supply line 53 to the starting device. The air supply line 53 does not point radially toward the central axis of the starting device; this embodiment of the starting device instead permits attaching the air supply line eccentrically in such a manner that the air enters the starting device tangentially.

FIG. 5 shows a different way of fastening the removable cover. Via three or four toggle levers 201 engaging the cover and the bottom of the housing 26, the section of corrugated pipe is stressed in compression in such a manner that it pushes against the cover with spring force, whereby the housing is closed off in a particularly gastight manner.

FIGS. 6 to 9 show how tube bundles of three, four, five or six corrugated tubes 301 to 304 can be held together by mounts 311 to 314 and resilient clamps 321 to 324. The mounting 313 shown in FIG. 8 consists of two identical pieces 315 and 316 which are intermeshed as shown in FIG. 8a. Such mountings cam be stamped, for instance, of stainless steel sheet.

A reformed gas generator according to FIG. 3, which is suited, for instance, for the operation of a medium sized passenger car, may, for instance, have an outside housing diameter of about 30 cm and a distance of about 14 cm between the cover and the bottom of the housing. In a compact configuration, it contains a mixer and distributor for the reactants, a reaction chamber with a catalytic charge, a fuel gas cooler which is designed as a heat exchanger for heating up the reactants (e.g., gasoline and air), and a starting device. After the clamping ring is removed, it divides into three components: the lower part of the housing, the cover of the housing and the reaction chamber; the reaction chamber can easily be replaced and the interior of the housing can readily be cleaned. The reformed gas generator according to the present invention is therefore particularly easy to maintain. On account of its simple design, it can furthermore be produced as a mass produced article at low cost.

We claim:
1. A gas generator for catalytically reacting liquid hydrocarbon containing fuel to be evaporated with a gas containing oxygen at elevated temperatures to form a fuel gas comprising:
   a. a heat resistant housing including a lower cup-shaped part and a removable lid;
   b. a replaceable cartridge disposed centrally in said housing spaced from the sides and bottom thereof, comprising:
     (i) a tubular casing having an open inlet and an open outlet and;
     (ii) a first plate containing a plurality of holes;
     (iii) a second plate containing a plurality of holes;
     (iv) means supporting said first plate at the inlet end of said casing and said second plate at the outlet end of said casing, said plates thereby defining a reaction chamber; and
     (v) a packed bed of catalyst disposed within said casing between said first and second plates.
   c. means disposed in said lid adapted to have the reaction media consisting of the liquid hydrocarbon fuel and gas containing oxygen supplied thereto for conducting said reaction media to the inlet end of said tubular casing, said inlet end of said tubular casing being in sealing contact with said means for supplying and forming a mixing chamber at said inlet end; and
   d. means for removing the fuel gas from said housing whereby, when said catalyst is no longer effective, replacement thereof requires only removing said lid and replacing said cartridge, removal of said cartridge also permitting access to said housing for cleaning thereof.

2. The gas generator according to claim 1, and further including additional plates with passage canals embedded in the catalyst packing perpendicular to the axis of said cylinder spaced one behind the other.

3. The gas generator according to claim 2, wherein said reaction chamber is fabricated of metal and has at least a partial ceramic lining.

4. The gas generator according to claim 3, wherein said lining contains ribs.

5. The gas generator according to claim 4, wherein at least one of said plates is a distribution plate.

6. The gas generator according to claim 5, and further including parts in the lower part of the housing and/or the cover containing depressions engaging parts of the reaction chamber.

7. The gas generator according to claim 6, wherein said reaction chamber is held fixed by the cover pressure when the cover is closed.

8. The gas generator according to claim 7, and further including support pieces to hold the reaction chamber spaced from the lower part of the housing.

9. The gas generator according to claim 8, wherein said support pieces comprise legs which stand perpendicular on the wall or the housing radiating from the outlet opening of the reaction chamber into the spaces between the reaction chamber and the lower part of the housing in starlike fashion.

10. The gas generator according to claim 8, wherein the part of the housing wall opposite the outlet opening of the reaction chamber, is domed toward the outlet opening.

11. The gas generator according to claim 10, wherein the lower part of the housing substantially has the shape of a cylindrical cup and further including a cylindrical partition extending from the bottom of the cup up into the vicinity of the cover dividing the space between the side wall of the reaction chamber and the lower part of the housing into an inner and an outer annular chambers surrounding the reaction chamber.

12. The gas generator according to claim 11, and further including at least one discharge stub for the fuel gas attached to the bottom of the outer annular chamber.

13. The gas generator according to claim 11, and further including at least one discharge stub extending tangentially out of the outer annular chamber in the vicinity of its bottom.

14. The gas generator according to claim 11, and further including cooling fins attached to the housing on its outside.

15. The gas generator according to claim 11, wherein the side wall of the lower part of said housing comprises a section of corrugated pipe.

16. The gas generator according to claim 15, and further including means stressing said section of corrugated pipe in compression when the cover is closed.

17. The gas generator according to claim 1 and further including a first system of tubes arranged in the space between the reaction chamber and the lower part of the housing, attached with both its ends to the cover and surrounding the reaction chamber in helical turns, said first system of tubes consisting of a bundle of tubes which run and are connected parallel to each other, for feeding at least one of the hydrocarbon fuel and oxygen containing gas to said means disposed in said lid.

18. The gas generator according to claim 17, wherein said first tube system is made of metallic corrugated tubing.

19. The gas generator according to claim 17, and further including spacers supporting the tubes of said tube buindle.

20. The gas generator according to claim 17, wherein said tubes are bundled by resilient metal clamps.

21. The gas generator according to claim 17, and further including comb-like mounts having tines holding the turns of said tube bundle.

22. The gas generator according to claim 17, wherein the tubes in a bundle are twisted relative to each other.

23. The gas generator according to claim 17, wherein said first tube system is used for feeding the oxygen containing gas, thereby heating it.

24. The gas generator according to claim 23, and further including a second system of tubes disposed in the space between the reaction chamber and the lower part of the housing for warming up the hydrocarbon fuel.

25. The gas generator according to claim 24, wherein said first and second systems of tubes open into said mixing chamber to feed the reactants thereto.

26. The gas generator according to claim 25, and further including a cavity in the cover in which said tubes systems end and passage openings therein leading to the mixing chamber.

27. The gas generator according to claim 26, wherein said cavity surrounds the mixing chamber in the form of a ring.

28. The gas generator according to claim 27, and further including baffles to conduct the reactants tangentially from said cavity into the mixing chamber.

29. The gas generator according to claim 25, wherein said mixing chamber is formed by parts of the cover and the boundardy of the reaction chamber.

30. The gas generator according to claim 25, and further including a starting device for burning fuel arranged at the cover of the housing and coupled thereto such that the hot gases produced by combustion therein can be fed into the mixing chamber.

31. The gas generator according to claim 1, wherein the lower part of the housing substantially has the shape of a cylindrical cup, the diameter of which is larger than or approximately equal to twice its height.

* * * * *